May 16, 1933.  B. DE MATTIA  1,909,574
VULCANIZING PRESS
Filed Dec. 17, 1929   3 Sheets-Sheet 1

INVENTOR.
Barthold De Mattia
BY
Morrison Kennedy Campbell
ATTORNEYS

May 16, 1933.  B. DE MATTIA  1,909,574
VULCANIZING PRESS
Filed Dec. 17, 1929  3 Sheets-Sheet 3

INVENTOR.
Barthold De Mattia
BY
ATTORNEYS

Patented May 16, 1933

1,909,574

UNITED STATES PATENT OFFICE

BARTHOLD DE MATTIA, OF PASSAIC, NEW JERSEY

VULCANIZING PRESS

Application filed December 17, 1929. Serial No. 414,648.

This invention relates to vulcanizing apparatus, and refers particularly to vulcanizing molds or presses for use in the production of pneumatic tires and other articles formed either partly or wholly of rubber.

An important feature of the invention is the provision of a vulcanizing mold or press with a simple and novel mechanism for opening and closing the mold or press, and for clamping the relatively movable sections in tightly closed relation so as to resist and overcome the great internal pressure developed within the molds during the vulcanizing operations.

More specifically, the invention contemplates a vulcanizing press having a lower fixed platen and an upper movable platen, which are hingedly connected together, and which are each adapted to give support to a mold section. A toggle mechanism is employed for raising and lowering the movable platen to open and close the press and for clamping the platens tightly together to hold the mold sections in close unyielding contact in the closed condition of the press, said toggle mechanism being actuated by a pressure cylinder and having a permanent and unbroken connection with both of the platens. In its collapsing movement, the toggle acts directly upon the movable platen to raise it and break the mold sections apart, whereas in its straightening out movement, the toggles act first to lower the movable platen to its closed position and then, as the toggle approaches "dead center", to exert a powerful clamping pressure on the mold sections to draw them firmly together.

The toggle mechanism includes a pair of long links disposed at opposite sides of the press and which are pivotally connected at their upper ends to the upper movable platen, and a pair of short links pivotally connected at their upper ends to the lower fixed platen and which are pivoted at their lower ends to the lower ends of the long links. At their pivotal point of connection, which constitutes the toggle joint proper, the toggle links are pivotally attached to the forward end of a piston rod, which has a double acting piston operating within a rocking pressure cylinder at the back of the press.

Another feature of the invention is the provision of simplified means for automatically rimming up a tire within the press in the closing operation, and further, the utilization of such mechanism for stripping the vulcanized tire from the mold cavity in the opening operation. This stripping mechanism is controlled and operated by the lower links of the toggle mechanism, so that a single source of power effects the stripping of the finished tires from the mold sections, as well as the opening and closing of the press.

The foregoing and other features and advantages of the invention will readily appear from the following description in connection with the accompanying drawings, wherein one form of the invention has been shown by way of illustration, and wherein Fig. 1 is a longitudinal sectional view, partly in elevation, of one form of press embodying the invention, and showing the parts in closed relation;

Figure 1:
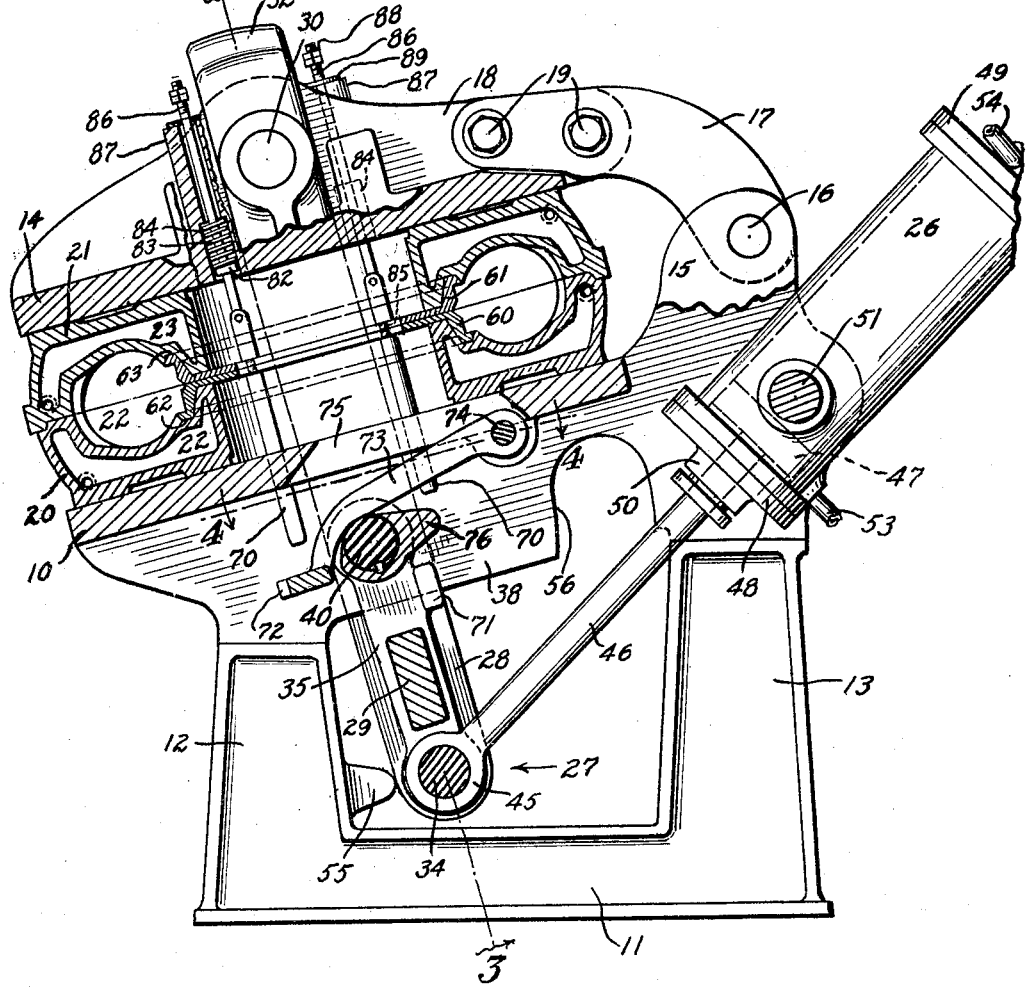

The improved tire vulcanizing press herein shown by way of example comprises a lower fixed platen or bed 10 supported by a suitable base 11 having front and rear pedestal portions 12 and 13, and an upper swinging platen or bed 14. The lower platen or bed 10 is provided at the rear with a pair of spaced-apart knuckles or arms 15, the upper ends of which are bifurcated and apertured for the reception of a transversely extending hinge pin or shaft 16. The upper swinging platen 14 is likewise provided with a pair of spaced-apart arms 17, which enter the bifurcated ends of the arms 15 and are pivotally supported therein by the hinge pin or shaft 16. For convenience in manufacture, the hinge arms 17, instead of being integral with the swinging platen 14 (as they might be), are made separate therefrom and are secured to suitable ribs 18 on the upper side of said platen by means of bolts 19.

Supported by the respective platens 10 and 14, and detachably secured thereto as by cap screws or the like not shown, are mold sections 20 and 21, the opposed faces of which are grooved to provide an annular mold cavity 22, within which a tire is adapted to be confined during vulcanization. These mold sections 20 and 21 are individually heated by the circulation of steam or other heating fluid through heating chambers or jackets 22 and 23 formed therein or thereon, such steam being supplied and drained through suitable piping forming no part of the present invention and which is therefore not shown in the drawings. By thus providing the mold sections directly with heating jackets, a better and more uniform cure is obtained, and this is especially advantageous when molds of different sizes are to be used interchangeably in the press. It is to be understood, however, that the heating chambers may be formed directly and permanently in the press platens, if so desired.

A rocking pressure cylinder 26 is employed to swing the upper platen 14 to its open and closed positions, said cylinder operating indirectly upon the platen 14 through the medium of a centrally-acting toggle mechanism designated generally by the reference character 27. This toggle mechanism comprises a pair of relatively long links 28 arranged at opposite sides of the press so as to straddle both of the platens, and a pair of short links 35 arranged below the fixed platen 10 and connected together by a solid crossbar or bridge member 29.

Figure 3:
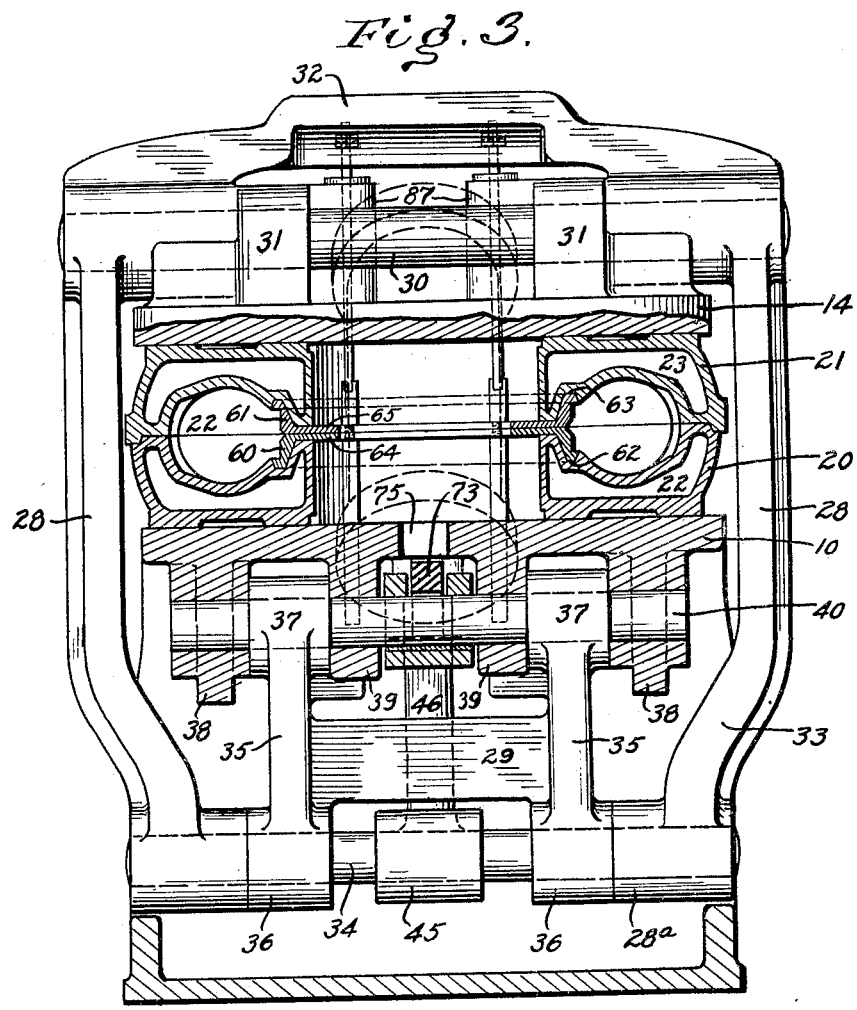
Fig. 3 is a vertical transverse sectional view taken on the line 3—3 of Fig. 1.
Figure 4:
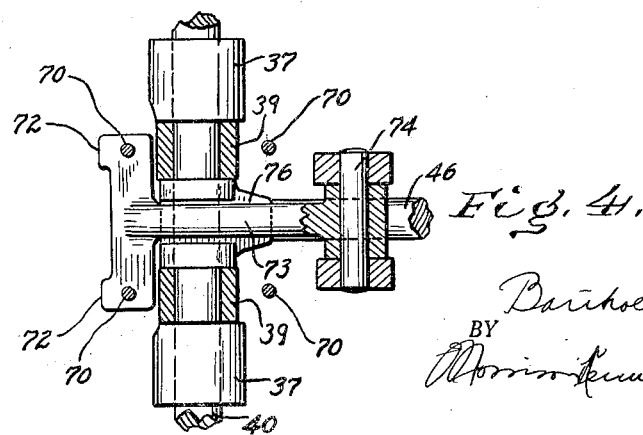
Fig. 4 is a fragmentary horizontal sectional view taken approximately on the line 4—4 of Fig. 1.

The upper ends of the long links 28 are pivotally attached to the upper platen 14 by means of a rock shaft 30, to which they are made fast and which extends transversely through suitable journal bearings 31 at the upper side of said platen. Of course, if desired, the shaft 30 could be fixed against rotation and the toggle links mounted to turn thereon. At their upper ends, the links are permanently tied together by an integral connecting web or cross-bar 32. At their lower ends, the links 28 are offset inwardly, as at 33, so as to terminate beneath the fixed platen 10 (see Fig. 3) and are connected together by a transverse pin or shaft 34, which also extends through and provides pivotal connection with the lower or free ends 36 of the short links 35. The upper ends 37 of these short links 35 are received between suitable ribs or lugs 38 and 39 on the lower side of the platen 10, and are pivotally attached thereto by means of a pin or shaft 40.

It is pointed out (see Figs. 1 and 3) that, when the press is closed, the links 28 and 35 are substantially in a straight line or "dead center" relation, and hence they act with great power to clamp the mold sections tightly together so as to resist the internal pressure created within the vulcanizing cavity 22. In the initial opening movement, the toggle has sufficient power to break the adhesion between the mold sections, after which it has only to overcome the weight of the upper platen 14 and its associated parts. These toggle actions will presently be described more fully.

In order to actuate the toggle mechanism, the lower end 45 of a piston rod 46 is pivotally attached to the transverse shaft 34, which joins the free ends of the links 28 and 35, and said piston rod 46 has at its upper or rearward end a double-acting piston 47 operating within the pressure cylinder 26. The pressure cylinder 26 is fitted with the usual closure heads 48 and 49, the head 48 having a stuffing box 50 through which the piston rod 46 slides and which prevents leakage of the pressure fluid past the sides of said rod.

It may here be noted that the cylinder 26 is provided, at its opposite sides and intermediate its ends, with trunnions 51 journaled in the lower portions of the fixed knuckles or arms 15 between which the cylinder is disposed. This arrangement allows the pressure cylinder to rock during the operation of the toggle links, such rocking movement being necessary because the connected ends of the links and the lower end of the piston rod swing toward and from the trunnions 51.

Pressure fluid, such as compressed air, steam, or water, is alternately admitted to and exhausted from the opposite ends of the cylinder 26 through suitable conduits 53 and 54 under the control of a manually or automatically operated valve mechanism not shown.

To prevent overthrow of the toggle mechanism in the closing of the press, there are provided suitable stops 55 formed integral with or secured to the rearward sides of the base pedestals 12, said stops being disposed in the path of movement of the lower or free ends of the long links 28. The mold opening movement of the toggle mechanism is limited by the indirect engagement of the pin or shaft 34 with the upper or closed ends of notches 56 formed in the ribs 38 of the lower platen, these notches being of such proportions as to admit entry of the bosses 28$^a$ on the lower ends of the links 28.

Figure 2:
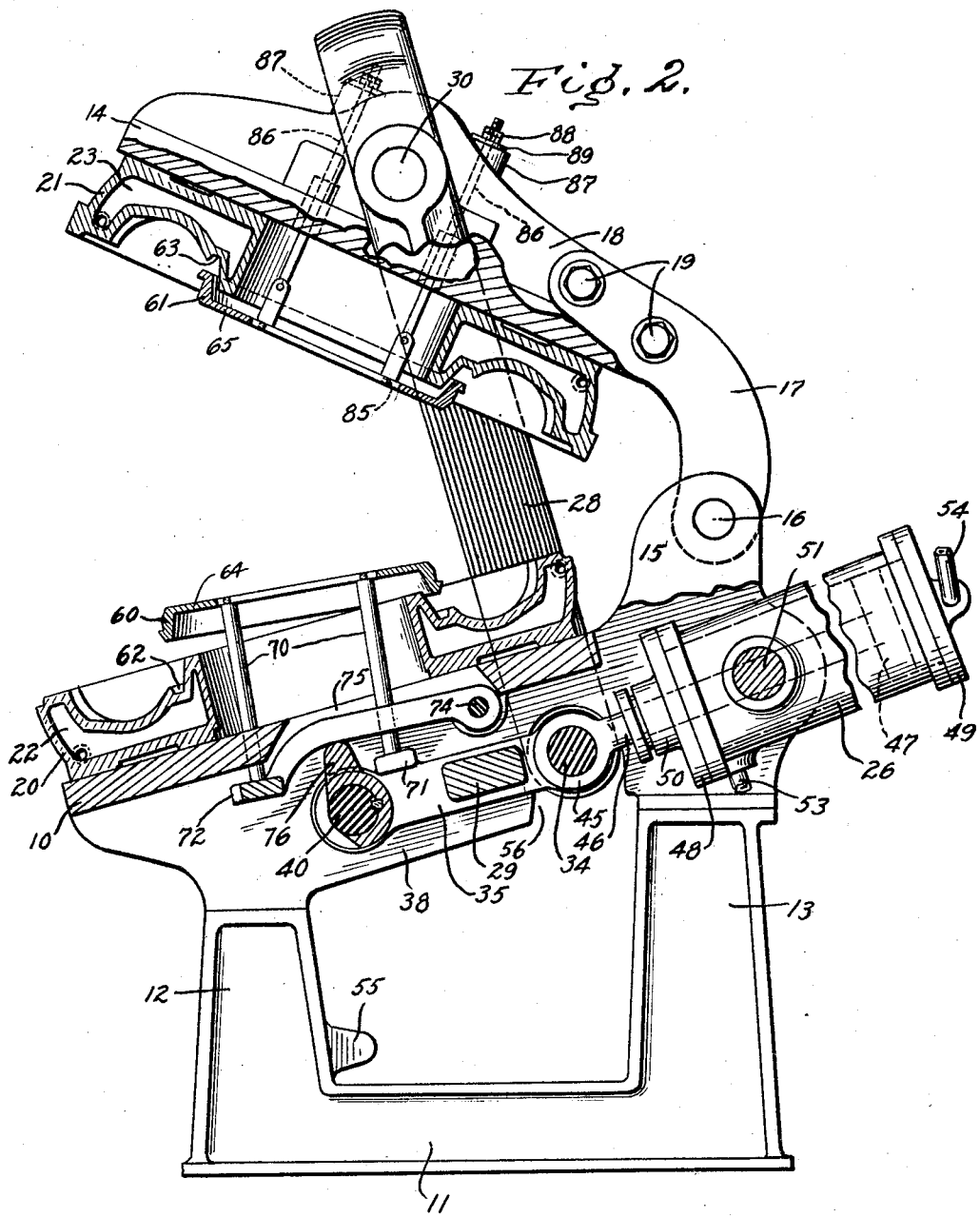
Fig. 2 is a similar view showing the press opened.

When the press is opened, the piston 47 is at the upper or rearward end of the cylinder 26, and the toggle is "broken", the links 28 and 35 being substantially perpendicular to each other as shown in Fig. 2. Now, to close the press, the attendant manipulates the control valve which admits pressure fluid to the rear end of the cylinder 26 and exhausts from the front end thereof, whereupon the piston moves forwardly and downwardly in the cylinder. This causes the joined ends 28ᵃ and 36 of the links 28 and 35 to swing downwardly about the axis of the rock shaft 40, the cylinder rocking on its trunnions 51, and the upper platen 14 following the descending links 28 to closing position. As the closing movement continues, the links 28 and 35 of the toggle approach their "dead center" or straight-line relationship so that, after the press is closed, they exert a powerful clamping pressure to close the press tightly and to maintain it in such condition during the entire vulcanizing operation.

To reopen the press at the end of the vulcanizing operation, the pressure is reversed in the cylinder 26 so as to force the piston 47 upwardly and rearwardly, and as this occurs, the lower end 45 of the piston rod 46 again swings the joined ends of the links 28 and 35 upwardly. In the initial opening movement as thus effected, the joint of the toggle is broken, and while the toggle has its greatest leverage or power, it overcomes the adhesion between the mold sections and cracks the press open, leaving the platen 14 free to be swung upwardly by the continued movement of the toggle links. It will be seen, therefore, that the toggle system acts directly upon the upper platen 14, not only to open and close the press, but also to clamp the platens together during the vulcanizing operation, and to break the adhesion between the mold sections after the vulcanizing operation has been completed.

It is to be noticed that in opening the press, the lower ends of the links 28 are swung rearwardly toward the hinge connection 16 of the platens, and this is a particularly desirable arrangement inasmuch as it allows the operator ample room for manipulation in placing and removing the tires. Not only are the lower ends of the links 28 disposed rearwardly of the transverse center of the lower platen, but they come to rest in a position where the annular shape of the mold itself provides clearance between the links. It is also pointed out that by reason of the fact that the outside toggle links 28 are connected to the upper plates 14 at substantially the line of its transverse center, the clamping pressure will be distributed uniformly over the entire parting line of the mold.

Ordinarily the tires are provided with expansible formers, such as air-bags or water-bags, and are mounted upon curing rims before being placed in the vulcanizing molds. While the same practice may be followed in the present press, it is proposed to employ means for automatically rimming the tires within the press during the closing operation. The same mechanism is also utilized for stripping the tires from the mold cavity as the press is opened, as will presently appear. The tire rimming and stripping means referred to comprise essentially two opposed annular ring members 60 and 61 associated with the respective mold sections 20 and 21, and which, when the press is closed, are adapted to be seated in annular grooves 62 and 63 formed in the mold sections at their inner peripheries. These ring members are of ordinary form, and provided on their meeting sides with annular flanges 64 and 65, respectively, which extend inwardly beyond the inner peripheries of the mold sections 20 and 21.

A plurality of vertically movable rods 70, preferably four in number and spaced substantially equi-distantly about the periphery of the lower ring member 60, have their upper ends secured to the flange 64 of said ring member and depend through the central opening in the mold section 20 and through suitably spaced openings in the platen 10, for the purpose of moving the ring member axially into and out of the groove 62. At their lower ends, two of the rods 70 (those at the rear side of the press) are adapted to be engaged by lugs 71 on the inner sides of the short links 35 when the latter are swung rearwardly and upwardly to open the press as in Fig. 2. Similarly, the lower ends of the other two rods 70 (those forward of the center of the press) are engageable by the forked forward end portions 72 of a rocker arm 73, the rear end of which is pivoted at 74 on the lower side of the platen 10. This rocker arm 73 extends transversely over the pin or shaft 45, and in a suitable clearance slot or opening 75 in the platen 10, and is rocked by means of a cam 76 secured to the pin or shaft 45 between the supporting lugs 39.

The foregoing arrangement is such that, as the piston 47 moves rearwardly in the cylinder 26 and acts upon the toggle mechanism to open the press, the rods 70 will be lifted and the ring member 60 forced upwardly out of its seat in the groove 62. In thus moving upwardly, the ring member 60, by reason of the engageemnt of its annular flange portion with the lower bead portion of the tire, will strip the tire from the mold cavity, and position it above and out of contact with the walls of the mold cavity.

The upper ring member 61 seats in the groove 63 in the upper mold section 21 when the press is closed, but is adapted to be forced axially out of said groove, as the press is opened. For this reason, the flange 65 of the ring member 61 is secured to the threaded lower ends 85 of four equally spaced apart suspension rods 86, which extend through suitable openings in the platen 14, and the upper ends of which project through bosses 87 on the upper side of said swinging platen. The upper ends of the suspension rods 86 are screw-threaded and fitted with adjustable stop nuts 88 which, when the press is closed as shown in Fig. 1, are spaced above suitable washers 89 on the upper ends of said bosses 87. The lower ends of the holes, through which the suspension rods 86 slide in the platen 14, are counterbored as at 84 (Fig. 1) to receive compression springs 83, the upper ends of which bear against the bottoms of the counterbores, while their lower ends bear against collars 82 which are secured to the rods 86. As the press is opened, the springs 83 act to force the ring 61 out of its seat in the groove 63, and thus maintain the ring 61 in engaging relation with the ring 60 and with the tire until the press has opened sufficiently to cause abutment of the stop washers 89 with the stop nuts 88. In this initial opening movement, the vulcanized tire is positively stripped from the upper half of the mold cavity, and thereafter the ring 61 is carried bodily upward with the swinging platen.

In the operation of the improved press, the attendant places a tire having an inflating bag disposed within it upon the ring member 60, and then, by proper manipulation of a control valve, not shown, admits pressure fluid (such as water) to the upper or rearward end of the cylinder 26, causing the piston 47 to move forwardly and downwardly and acting through the piston rod 46 and pin 34 to swing the connected ends of the links 28 and 35 downwardly, closing the press. In the initial downward movement of said links, the movement of the cam 76 causes the rocker arm 73 to drop, and this, coupled with the recession of the lugs 71, lowers the tire supporting ring member 60 into the annular groove 62 in the lower mold section 20, and thus positions the tire in the lower half of the mold cavity. As the upper platen 14 and its associated parts approach the lower platen, the upper ring member 61 enters the upper bead of the tire, and as the movement continues said ring member 61 becomes seated in the annular groove 63 of the upper mold section 21 and its flanged portion comes into contact with the upper bead of the tire, whereby to confine it in proper relation to the lower bead. In the final closing movement, that is, when the piston 47 approaches the lower or forward end of the cylinder 26, the toggle links 28 and 35 approach "dead center" or a straight-line relationship as shown in Fig. 1, and act to draw the upper platen 14 downwardly toward the fixed platen with a powerful clamping pressure, this pressure being great enough to effect the "rimming-up" of the tire, as well as to hold the two mold sections tightly together during the vulcanizing operation. It is of course understood that the inflatable former, such as a water-bag or air-bag which is arranged within the tire, is provided with one or more inflation valve stems, and that a suitable pressure medium is admitted into or circulated through the bag to press or expand the tire outwardly against the mold walls under the desired pressure.

After the tire has been thus subjected to the vulcanizing pressure and temperature for a sufficient length of time, the attendant operates the control valve to admit pressure fluid to the lower or forward end of the cylinder 26, causing the piston 47 to move upwardly and rearwardly therein and to act through the piston rod 46 and shaft or pin 34 to swing the connected ends of the links 28 and 35 upwardly, breaking the toggle joint and raising the upper platen 14 to the position shown in Fig. 2.

It is to be noticed that when the press is closed, as in Fig. 1, the lower ends of the rods 70 are entirely out of contact with the lugs 71 and forward ends 72 of the rocker arm 73, and that the parts are so proportioned that these rods 70 are not forced upwardly until the upper platen 14 has moved a substantial distance away from the lower platen 10. By virtue of this fact, the stripping of the vulcanized tire from the cavity of the lower mold section 20 can be very easily effected by the ejection of the ring member 60 from the mold groove 62 after the opening operation has continued sufficiently to clear the tire from the upper mold section. In the open condition of the press, the attendant can very easily and quickly remove the vulcanized tire from the ring 60 and replace the same with another unvulcanized tire, after which the operation can be repeated.

From the foregoing it will be evident that an improved vulcanizing press has been provided with a simplified power mechanism for opening and closing the press, and for locking the upper platen in its closed position. While the press has been described as equipped for manual control, it is equally well adapted for automatic control by a time measuring mechanism such that the press will be automatically opened and the vulcanized tire automatically stripped from the mold cavity at the end of a definite time period. It is also to be understood that the improved press is adapted for use in connection with molds for articles other than pneumatic tires, and in fact the invention is susceptible of numerous modifications in the details of construction and arrangements of parts. The right is therefore reserved to make such changes as fall within the scope of the appended claims without departing from the spirit of the invention. In the appended claims, the reference to platens is intended to apply to any form of mold supporting members, and not merely to a flat bed or plate such as shown.

Having thus described my invention, what I claim is:

1. A vulcanizing press comprising a pair of platens mounted for relative movement toward and from each other and adapted to give support to opposed mold sections, a toggle straddling the platens and acting directly thereon to clamp them in tight mold-closing relation when the toggle is straightened, and power means acting directly on the joint of said toggle to operate the same to open and close the press.

2. A vulcanizing press comprising a lower fixed platen, an upper movable platen, a toggle straddling the platens and acting directly on the upper platen and adapted when straightened to clamp the same tightly in closed position, a pressure cylinder mounted independently of the movable platen and having a piston operatively connected to the toggle and acting in opposite directions alternately to straighten and break the same to open and close the press, and means for initiating the operation of the pressure cylinder.

3. A vulcanizing press comprising a pair of opposed platens hingedly connected together, and a toggle system for opening and closing the press, the said toggle system including a link pivoted at one end to the upper of said platens and extending downwardly past the lower platen, a second link pivoted at one end to the lower platen and jointed at its opposite end to the free end of the first link, and means acting upon said links at the joint to collapse and extend the toggle in opening and closing the press.

4. A vulcanizing press comprising a fixed platen and a movable platen hinged with reference thereto, a toggle link pivotally attached at one end to the movable platen, a second toggle link connecting the other end of said link to the fixed platen, and power-operated means mounted independently of the movable platen and having a reciprocatory member acting in opposite directions on said toggle links to swing the movable platen toward and from the fixed platen.

5. A vulcanizing press comprises a lower fixed platen and an upper movable platen hinged with reference thereto, and a toggle mechanism for swinging the movable platen to open and closed positions, said toggle mechanism comprising a link pivoted directly to the movable platen and a second link pivoted directly to the fixed platen, said links being jointed together at a point below the fixed platen, and power means acting on the jointed ends of said links to operate the toggle mechanism.

6. A vulcanizing press comprising a lower fixed platen and an upper movable platen hinged with reference thereto, and a toggle mechanism for swinging the movable platen to open and closed positions, said toggle mechanism comprising a link pivoted directly to the movable platen and a second link pivoted directly to the fixed platen, said links being jointed together at their free ends below the fixed platen and arranged so as to have their pivot points all substantially in line with each other when the press is closed, and power means below the fixed platen operative in opposite directions on the toggle mechanism to open and close the press.

7. A vulcanizing press comprising a fixed platen and a movable platen hinged with reference thereto, a pair of toggle links arranged at opposite sides of the press and pivotally attached at one end to the movable platen, a second pair of toggle links pivotally attached at one end to the fixed platen and jointed at the other end to the free or unattached ends of the first links, and power means mounted independently of the movable platen acting upon the toggle links at their jointed ends to close and open the press.

8. A vulcanizing press comprising a lower fixed platen and an upper swinging platen, a pair of long toggle links pivotally attached at their upper ends to the swinging platen and depending therefrom at opposite sides past the fixed platen, a second pair of short toggle links pivotally attached at their upper ends to the fixed platen and jointed at their lower ends to the lower ends of the first links, and power-operated means connected to the toggle links at their jointed ends to close and open the press.

9. A vulcanizing press comprising a lower fixed platen and an upper swinging platen, a pair of long toggle links pivotally attached at their upper ends to the swinging platen and depending therefrom at opposite sides past the fixed platen, a second pair of short toggle links pivotally attached at their upper ends to the fixed platen and jointed at their lower ends to the lower ends of the first links, and fluid pressure means operatively connected to the toggle links at their jointed ends to raise and lower the swinging platen.

10. A vulcanizing press comprising a lower fixed platen and an upper swinging platen, a pair of long toggle links pivotally attached at their upper ends to the swinging platen and depending therefrom at opposite sides past the fixed platen, a second pair of short toggle links pivotally attached at their upper ends to the fixed platen and jointed at their lower ends to the lower ends of the first links, and power-operated means connected to the toggle links at their jointed ends and operative thereon to close and open the press, the respective links being so arranged as to be substantially in line with each other when the press is closed.

11. A vulcanizing press comprising a lower fixed platen and an upper swinging platen, a pair of long toggle links straddling the outer sides of the press and pivotally attached at their upper ends to the upper platen at substantially the transverse center thereof and depending below the fixed platen, a pair of short toggle links pivotally attached at their upper ends to the lower side of the fixed platen at substantially the transverse center thereof, a pin connecting the free lower ends of said long links with the free lower ends of the short links, and a rocking pressure cylinder pivoted at the rear of the press and fitted with a double-acting piston and a forwardly extending piston rod, the lower end of said piston rod being connected to the lower ends of said links by means of said connecting pin.

12. In combination with a tire vulcanizing press having a fixed mold section, a movable mold section, and a toggle system for opening and closing the press, means for seating a tire in and stripping it from the mold cavity as the mold is respectively closed and opened, said means comprising a pair of separable coaxial ring members having flange portions for engaging the beads of the tire and being adapted to seat in grooves in the opposing faces of the mold sections, means loosely suspending one of said ring members from the movable mold section, and means actuated directly by said toggle system for moving the other ring member into and out of its seat in the fixed mold section as the mold is respectively closed and opened.

13. A tire vulcanizing press comprising a fixed annular mold section, a movable cooperating mold section, a tire supporting rim arranged to seat in the respective mold sections at their inner peripheries, said rim being composed of two separate ring members, one carried by the movable mold section, and the other associated with the fixed mold section, and means including a rocker arm and a cam for shifting the ring member of the fixed mold section into and out of the same in the closing and opening of the press.

14. A tire vulcanizing press according to claim 12, wherein said last-mentioned actuating means includes a rocker arm and a cam having lost motion with reference to the toggle system.

15. A vulcanizing press comprising a pair of opposed platens, one fixed and the other movable, a toggle system permanently connected to the movable platen and operable to open and close the press, and a pressure cylinder for actuating the toggle system in opening and closing the press, said pressure cylinder being rockably supported on the fixed platen and having its piston operatively connected to the toggle system.

16. A vulcanizing press comprising a lower fixed platen and an upper swinging platen, a pair of long toggle links pivotally attached at their upper ends to the swinging platen and depending therefrom at opposite sides past the fixed platen, a second pair of short toggle links pivotally attached at their upper ends to the fixed platen and jointed at their lower ends to the lower ends of the first links, and power-operated means operatively connected to the toggle links and movable in opposite directions to actuate the same in opening and closing the press, respectively.

17. A vulcanizing press comprising a lower fixed platen and an upper swinging platen, a pair of long toggle links pivotally attached at their upper ends to the swinging platen and depending therefrom at opposite sides past the fixed platen, a second pair of short toggle links pivotally attached at their upper ends to the fixed platen and jointed at their lower ends to the lower ends of the first links, and power means for rocking the second pair of toggle links in opposite directions about their upper ends as an axis in opening and closing the press.

18. A press according to claim 17, characterized by the fact that the extent of rocking of the second pair of toggle links is limited substantially to 90°.

In testimony whereof, this specification has been duly signed by:

BARTHOLD DE MATTIA.